(12) United States Patent
Singh et al.

(10) Patent No.: US 7,787,496 B1
(45) Date of Patent: Aug. 31, 2010

(54) PACKET FRAGMENTATION TECHNIQUES FOR MULTIPLE T-1 LINES

(75) Inventors: Jasinder Singh, Olathe, KS (US); Ashish Bhan, Shawnee, KS (US); Jason Sigg, Olathe, KS (US); Anil Singh, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 190 days.

(21) Appl. No.: 12/041,023

(22) Filed: Mar. 3, 2008

(51) Int. Cl.
*H04J 3/24* (2006.01)
(52) U.S. Cl. .................................... 370/474
(58) Field of Classification Search ................ 370/328, 370/352, 472, 473, 474, 476
See application file for complete search history.

(56) References Cited

U.S. PATENT DOCUMENTS 7,170,871 B2   1/2007   Eyuboglu et al.
2004/0218617 A1* 11/2004  Sagfors ....................... 370/412
2006/0136542 A1*  6/2006  Natarajan et al. ............ 708/650
2006/0268717 A1* 11/2006  Kanterakis .................. 370/235
2007/0280123 A1* 12/2007  Atkins et al. ................ 370/252

OTHER PUBLICATIONS

Nandlall, Vish, "CDMA2000 1xEV-DO: An Easy Upgrade Path to Mobile Broadband Services", Nortel Technical Journal, Issue 2, pp. 6-12; www.nortel.com/corporate/news/collateral/ntj2_1xev-do.pdf.
Gentry, Josh, "Cisco T1 Load Balancing HOWTO", http://www.joshgentry.com/cisco/cisco-load.shtml.

* cited by examiner

Primary Examiner—Hanh Nguyen
Assistant Examiner—Juvena Loo (57) ABSTRACT

Packets are broken into fragments when received by a radio network controller. The fragments are sized according to the network connection that are to receive the fragments. With a T-1 connection, the radio network controller attempts to create fragments of a packet with a maximum size of 1200 bytes. The radio network controller also attempts to send fragments of the same packet across the same network connection or T-1 line when multiple network connections or multiple T-1 lines exist.

17 Claims, 5 Drawing Sheets

PACKET FRAGMENTATION TECHNIQUES FOR MULTIPLE T-1 LINES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Packets such as internet protocol (IP) packets can be broken into fragments for delivery across a network. For example, in an environment with multiple T-1 lines, the fragments can be distributed across several T-1 lines to be re-joined at a terminating device. Several devices currently take advantage of this technique by distributing fragments of packets on a round-robin basis among multiple T-1 lines. Typically, this delivery of fragments of packets occurs in a wireless packet data environment where there exists a packet data service node (PDSN), a radio network controller (RNC), and a base transceiver station (BTS).

One of the problems of delivering fragments of packets over multiple T-1 lines is that the fragments may arrive at their destination at different times causing a delay. For example, several fragments may take different routes to reach the same destination. As a result, some service providers have resorted to building in a delay scheme to allow fragments to "catch-up" with each other before finally delivering the re-joined packet to its final destination. Unfortunately, the built-in delay may not be enough time to allow the fragments to come together again. When this happens, the devices can drop the fragments resulting in a re-transmission of the fragments or the entire packet.

Another problem of delivering fragments of packets over multiple T-1 lines is that the fragments may arrive at their destination out of sequence. When this occurs, the entire packet is dropped since the device at the destination may not have enough intelligence to re-order the fragments. Typically, this action can occur with a data only module (DOM) that is found in a base transceiver station (BTS). Therefore, if a fragment arrives out of sequence at the DOM, the entire packet gets dropped.

Some service providers have resorted to implementing additional devices such as a load balancer into the network in order to handle the delay time to re-join fragments of packets or to keep packets from arriving at the DOM out of sequence. Several manufacturers make devices like the load balancer which includes the functionality of a router and algorithms. Such devices include the multi-link point-to-point protocol (MLPPP) by companies such as Cisco Systems of San Jose, Calif. and Juniper Networks, Inc. of Sunnyvale, Calif. Unfortunately, this implementation introduces additional overhead by requiring additional IP addresses and headers to be implemented between the RNC and BTS. In addition, this implementation reduces the overall throughput of data that can be transferred throughout the network. For example, the load balancer can be programmed to increase the wait times to allow fragments to re-join together. However, this increase in time means that less data will actually flow through the network. Less packets that can be transferred from one destination to another results in less revenue for the service provider.

A solution is needed that can allow fragments of packets to flow across multiple T-1 lines or other connections without the need for increased delay times to re-join the fragments. The solution needs to allow the fragments to arrive in sequence at their destination. The solution should solve both the timing (delay) and path (out-of-sequence) issues without the need for additional devices such as the load balancer and re-sequencing timer at the BTS.

SUMMARY

The present invention is defined by the claims below. Embodiments of the present invention solve at least the above problems by providing media and a system for, among other things, fragmenting a packet for delivery in an environment with multiple network connections and optimizing packet fragmentation across multiple T-1 lines.

In a first aspect, computer-readable storage media having computer useable instructions embodied thereon is provided that performs a method for fragmenting a packet for delivery in an environment with multiple network connections. In the method, a packet is received at a radio network controller. The packet is analyzed to determine a packet size of the packet. If the packet size of the packet is 734 bytes or less, the packet is sent for delivery across a network connection in the environment with the multiple network connections. If the packet size is larger than 734 bytes, the packet is broken into fragments to achieve a fragment size that is a maximum size that can pass across the network connection. The fragments are sent across the same network connection.

In another aspect, a radio network controller is provided that optimizes packet fragmentation across multiple T-1 lines. The radio network controller operates with a processor and a memory. The radio network controller operates to receive packets over an A10 interface, breaks a packet into fragments, attempts to create the fragments with a maximum size that can be sent across a network connection, and sends each of the fragments across the network connection rather than a different network connection.

In yet another aspect, computer-readable storage media having computer useable instructions embodied thereon is provided that performs a method for optimizing packet fragmentation across multiple T-1 lines. In the method, a radio network controller operates with a processor and a memory. A plurality of packets is received at the radio network controller over an A10 interface. A packet is broken into fragments with an attempt to create the fragments with a maximum size that can be sent across a network connection. Each of the fragments is sent across the network connection rather than a different network connection.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide media and an apparatus for fragmenting a packet for delivery in an environment with multiple network connections and optimizing packet fragmentation across multiple T-1 lines.

Many different arrangements of the various components depicted, as well as components not shown, are possible without departing from the spirit and scope of the present invention. Embodiments of the present invention will be described with the intent to be illustrative rather than restrictive. Alternative embodiments will become apparent to those skilled in the art. A skilled artisan may develop alternative means of implementing improvements without departing from the scope of the present invention.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| 3GPP | Third Generation Partnership Project |
| 3GPP2 | Third Generation Partnership Project 2 |
| BSC | Base Station Controller |
| BTS | Base Transceiver Station |
| CD | Compact Disc |
| CD-ROM | Compact Disc-Read-Only Memory |
| DOM | Data-Only Module |
| IP | Internet Protocol |
| IPAGG | IP Aggregator (IP Router) |
| IS-856 | 1xEV Standard by TIA/EIA |
| MLPPP | Multi-Link Point-to-Point Protocol |
| PDSN | Packet Data Serving Node |
| RNC | Radio Network Controller |

Further, various technical terms are used throughout this description. A definition of such terms can be found in *Newton's Telecom Dictionary* by H. Newton, 23$^{rd}$ Edition (2007). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions including data structures and program modules. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Packet Fragmentation Techniques

Figure 1:
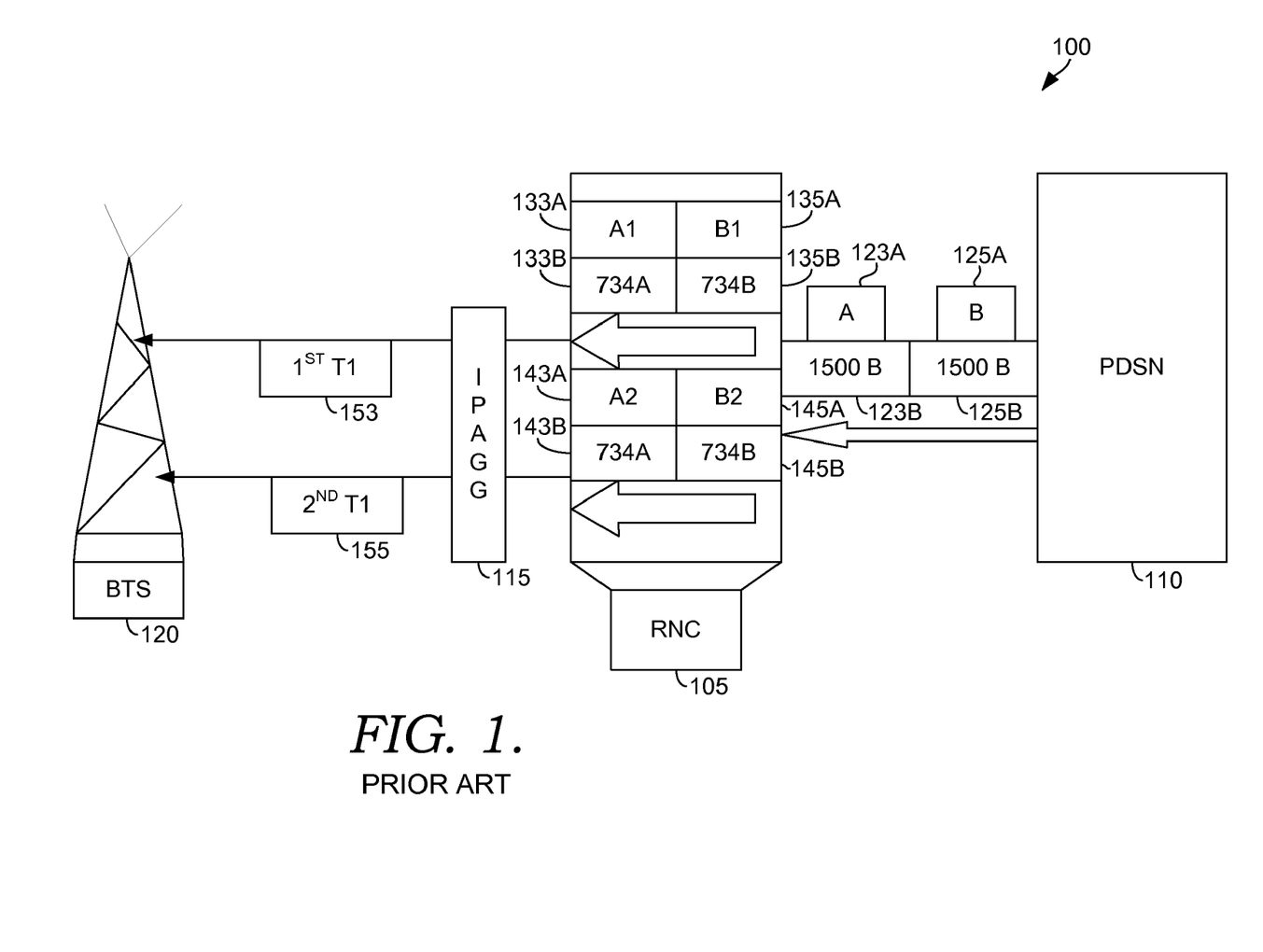
FIG. 1 is a block diagram of an exemplary operating environment implemented without practicing an embodiment of the present invention.

In FIG. 1, an operating environment 100 is shown with an RNC 105 connected to a PDSN 110. RNC 105 is also connected to an IPAGG 115 which is connected to a BTS 120. Environment 100 is typical of a wireless data network. Users that are connected to environment 100 can access internet services.

Environment 100 illustrates how data is handled without an implementation of an embodiment of the present invention. To reach users, packets of data flow between PDSN 110, through the illustrated components, and the user's device (not shown). As shown in FIG. 1, a packet 123B which corresponds to a packet symbol 123A has 1500 bytes. A packet 125B which corresponds to a packet symbol 125A also has 1500 bytes. Packets 123B and 125B flow from PDSN 110 to RNC 105. It is noted that packets 123B and 125B can vary in length and are only depicted here at 1500 bytes for illustrative purposes.

When packets 123B and 125B enter RNC 105, RNC 105 breaks the packets into fragments and routes them for delivery over various network connections. RNC 105 is known as a radio network controller and controls the flow of communications and implements management functions to various base station transceivers such as BTS 120. RNC 105 also performs the same functions to Node Bs which may be used in place of the BTS. Additional information may be obtained about radio network controllers such as RNC 105 from various documents. In particular, documentation and standards information regarding radio network controllers may be obtained from the 3$^{rd}$ Generation Partnership Project of Sophia Antipolis, France and the 3$^{rd}$ Generation Partnership Project 2 of Arlington, Va. It is also noted that a base station controller may be used in some instances where a radio network controller is unavailable.

The manner in which packets are broken into fragments in RNC 105 is influenced by protocols at the interface or over the network connections. For example, an Abis interface can exist between RNC 105 and BTS 120. The Abis interface dictates that for any packet that is 734 bytes or less, the packet is not broken into fragments. However, for packets larger than 734 bytes, RNC 105 breaks the packets into fragments. The purpose for breaking the packets into fragments is to balance the load for delivery across the various network connections. In particular, each fragment may be sent across a different network connection to perform load balancing.

In FIG. 1, packet 123B is broken into fragments 133B and 143B. Packet 125B is broken into fragments 135B and 145B. Stated another way, RNC 105 encapsulates packet 123B into Abis packets identified as fragments 133B and 143B. Respectively, packet symbols 123A and 125B correlate to fragment symbols 133A, 143A, 135A, and 145A. RNC 105 sends fragment 133B over a connection 153 to BTS 120 while fragment 143B is sent over a connection 155 to BTS 120. Connections 153 and 155 can be a T-1 line which can handle a maximum of 1200 bytes per packet or fragment. Eventually, fragments 133B and 143B are put together inside BTS 120 at a device called a data-only module (not shown).

One of ordinary skill in the art understands that a T-1 line is a connection that supports data rates of 1.544 megabits per second. A T-1 line has twenty-four (24) channels, each of which supports 64 kilobits per second. Each channel can be configured to carry voice or data traffic. In an alternate embodiment, an E-1 line or other connection may be implemented.

In addition to RNC 105 breaking a packet into fragments for load balancing purposes, RNC 105 breaks the packet into fragments in order to avoid packets from reaching their destination out of order. However, this holds true for ideal situations where packets come in fixed sizes and multiple T-1 connections are of the same length. Even under these circumstances, packets still manage to arrive at their destination out of order.

The maximum payload for Abis packets destined to the data-only module in BTS 120 is 1200 bytes. However, the maximum payload can vary depending on the protocol in the network connection and the type of data-only module located at the destination. In FIG. 1, the largest packet (such as fragment 133B) created by RNC 105 destined for the data-only module in BTS 120 is 734 bytes. Because there is still enough room for additional bytes in the payload, RNC 105 tries to reduce the packet overhead over the Abis interface by maximizing the usage of the available payload. Before sending the Abis packet such as fragment 133B, RNC 105 may wait up to five (5) milliseconds and evaluate if an additional fragment or packet can be appended before sending the entire payload to the same data-only module. This subsequent fragment or packet is typically data destined for the same user or same data-only module. For example, if a first fragment is 734 bytes then the next fragment or additional fragments can total no more than 466 bytes complying with the statement above that the maximum payload is 1200 bytes.

One of the drawbacks to the implementation in FIG. 1 is that BTS 120 has to wait for a specified amount of time for fragments 133B and 143B to arrive before they can be sent to a user's device. If the timer expires before all the fragments arrive for a particular packet, the packet is dropped causing data throughput to go down.

Figure 2:
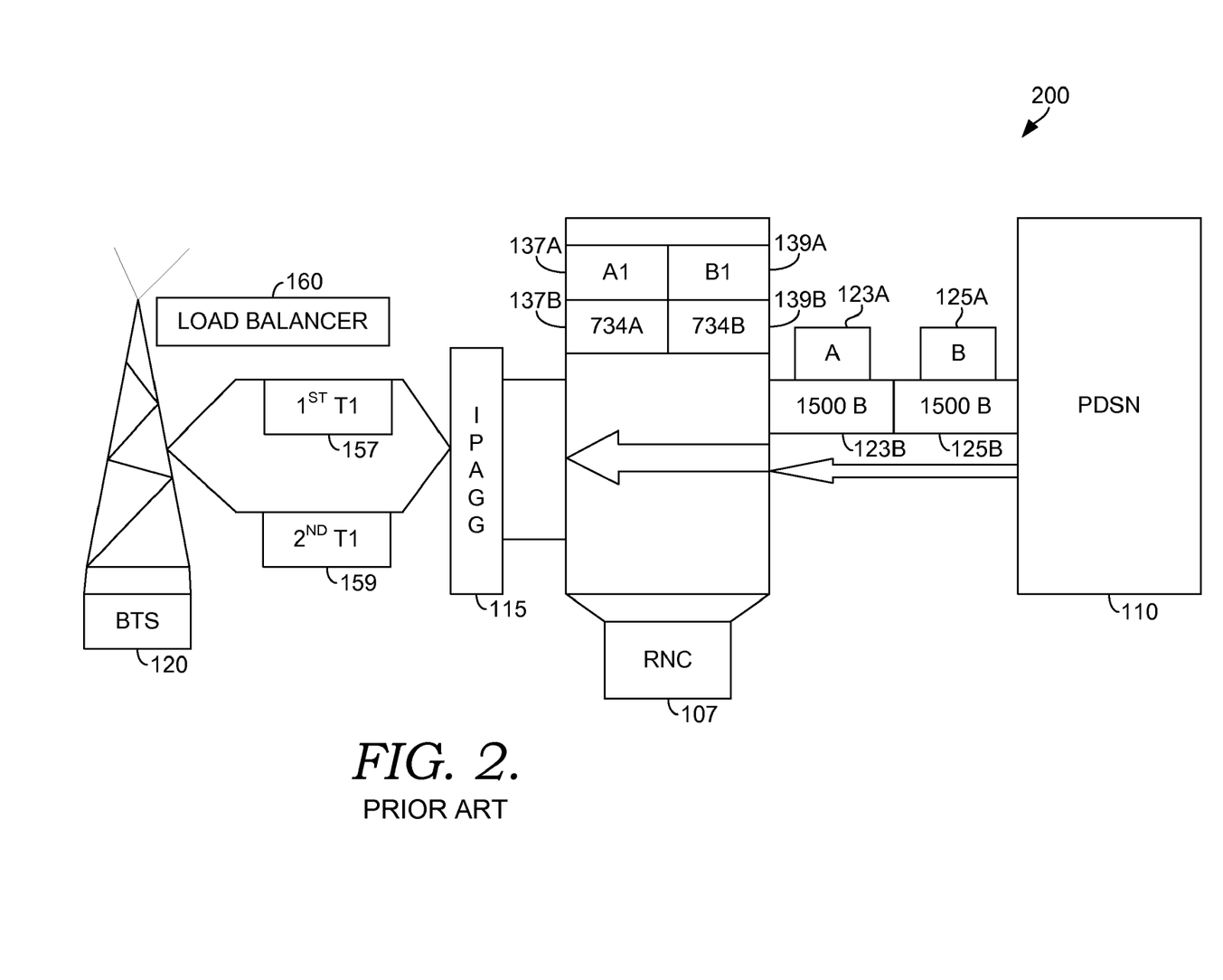
FIG. 2 is a block diagram of an exemplary operating environment with an exemplary load balancer implemented without practicing an embodiment of the present invention.

In FIG. 2, an operating environment 200 is shown with similar elements identified in FIG. 1. Environment 200 illustrates how data is handled without an implementation of an embodiment of the present invention but with the implementation of a load balancer 160. Environment 200 focuses on resolving the problems of environment 100 in FIG. 1. As a result, an RNC 107 is shown with fragments 137B and 139B. Fragments 137B and 139B are Abis packets that come from the encapsulation of packet 123B. Fragments 137B and 139B are sent over connections 157 and 159 which are usually T-1 lines.

In FIG. 2, load balancer 160 is shown between IPAGG 115 and BTS 120. Typically, load balancer is an algorithm at IPAGG 115. Load balancer 160 is used keep fragments from arriving out of sequence at their destination. In addition, load balancer 160 allows an adjustable time delay period to be implemented so that fragments may be re-appended at the destination. In some circumstances, this delay may be thirty-five (35) milliseconds but can go as high as seventy-five (75) milliseconds.

Although the implementation of load balancer 160 solves the problem of fragments arriving out of sequence and the problem of fragments arriving on time to be re-appended properly, load balancer 160 requires an additional set of IP addresses to be used between RNC 107 and BTS 120. The implementation of the additional set of IP addresses causes more overhead to be introduced in the packet header. In addition, data throughput of the fragments is affected because the increase in time to wait for fragments reduces the amount of fragments that can be sent from RNC 107 to BTS 120.

Figure 3:
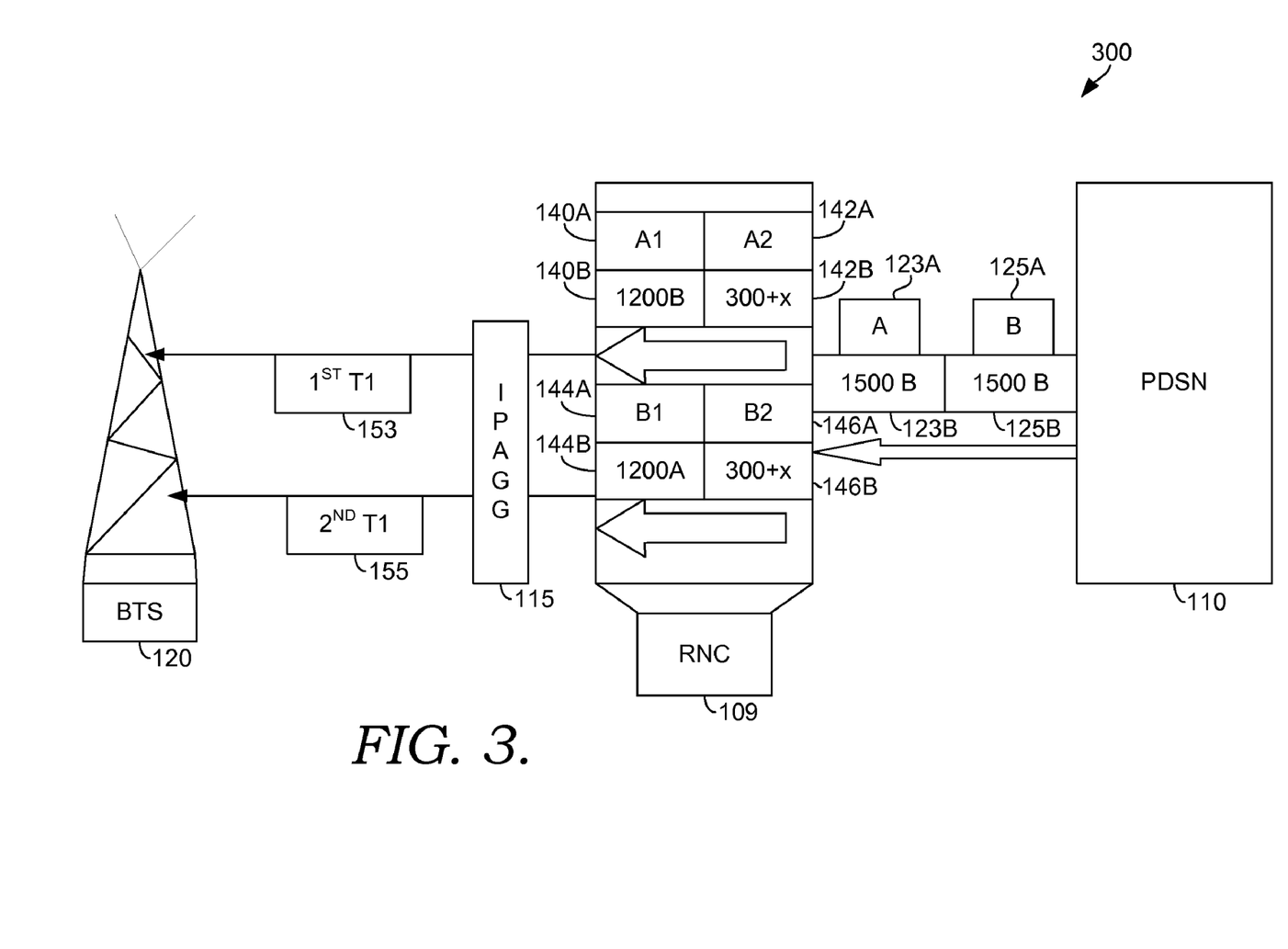
FIG. 3 is a block diagram of an exemplary operating environment suitable for practicing an embodiment of the present invention.

Turning now to FIG. 3, an operating environment 300 is shown in an implementation of an embodiment of the present invention. Environment 300 includes similar components to those identified in environments 100 and 200 in FIGS. 1 and 2. In addition, environment 300 includes an RNC 109 with fragments 140B, 142B, 144B, and 146B. Respectively, those fragments are represented by fragment symbols 140A, 142A, 144A, and 146A.

In FIG. 3, instead of distributing fragments of a packet on a round robin basis among T-1 lines as done in FIGS. 1 and 2, a complete packet may be delivered across a single T-1 line destined for the same data-only module in BTS 120. With this configuration, load balancing is still maintained. For example, RNC 109 has some intelligence about the connections that should receive the fragments. As a result, RNC 109 encapsulates packet 123B into fragments 140B and 142B based on the intelligence it has about the connections. Fragment 140B is set to a maximum size of 1200 bytes which corresponds to the maximum size for a packet that traverses across a T-1 line. Fragment 142 represents any remainder portion of packet 123B after fragment 140B is created. It should be noted that although two fragments are created for a packet, numerous fragments can be created especially if the packet 123B is much larger than 1500 bytes. A similar arrangement is performed for packet 125B.

So, rather than dividing a packet into equal-sized fragments, environment 300 in RNC 109 maximizes the size of each fragment. The first fragment, such as fragment 140B, is maximized to a size of 1200 bytes because of the T-1 connection. With an E-1 connection, this maximum can be different. Fragment 140B is delivered through IPAGG 115 across connection 153 to BTS 120. Within BTS 120, fragment 140B is delivered to the data-only module to wait for the remaining fragment(s).

Fragment 142B also needs to be delivered to the data-only module. However, since fragment 142B may be smaller in size to the maximum payload of 1200 bytes, RNC 109 may wait for a time period and append up to 900 bytes of data to fragment 142B before delivery. This assumes that fragment 142B is 300 bytes. As a consequence, this arrangement allows RNC 109 to efficiently maximize throughput across the T-1 line identified as connection 153.

Figure 4:
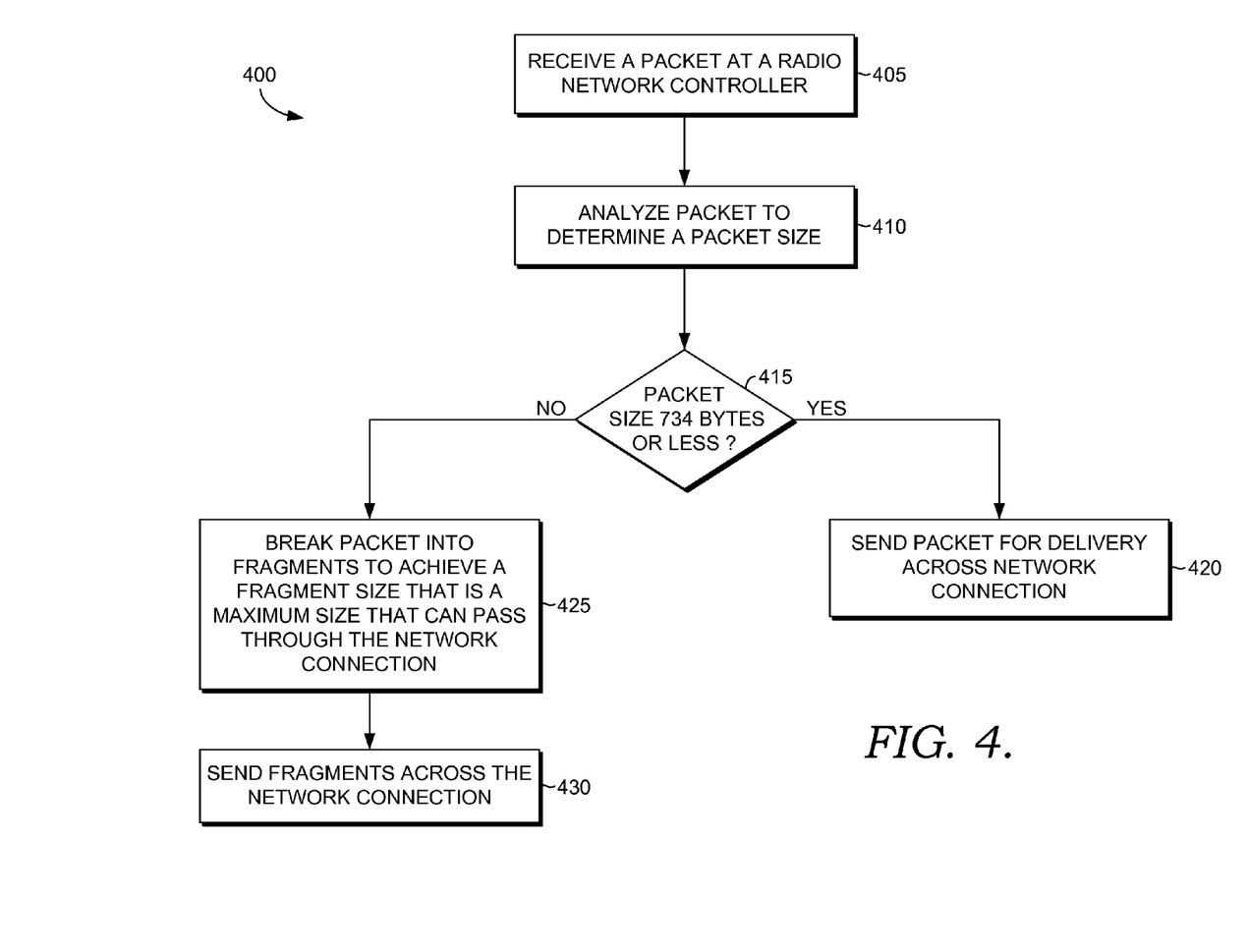
FIG. 4 is a flowchart of an exemplary process for fragmenting a packet for delivery when practicing an embodiment of the present invention.

In FIG. 4, a process for fragmenting a packet for delivery is shown in a method 400. In a step 405, packet 123B is received at RNC 109. Packet 125B is also received at RNC 109. In a step 410, RNC 109 analyzes the packets and determine a packet size for each packet 123B and packet 125B. In a step 415, a determination is made whether the packet size is 734 bytes or less. If the packet size for packets 123B and 125B is 734 bytes or less, in a step 420, the packet is sent for delivery across the T-1 line. If the packet size for packets 123B and 125B is more than 734 bytes, in a step 425, packet 123B is broken into fragments to achieve a fragment size that is a maximum size that can pass through the T-1 line. In other words, since packet 123B is 1500 bytes, fragment 140B is created at 1200 bytes and fragment 142B is created at 300 bytes. For packet 125B, fragment 144B is created at 1200 bytes and fragment 146B is created at 300 bytes. In a step 430, fragments 140B and 142B are sent across the T-1 line represented by connection 153 while fragments 144B and 146B are sent across the T-1 line represented by connection 155.

Figure 5:
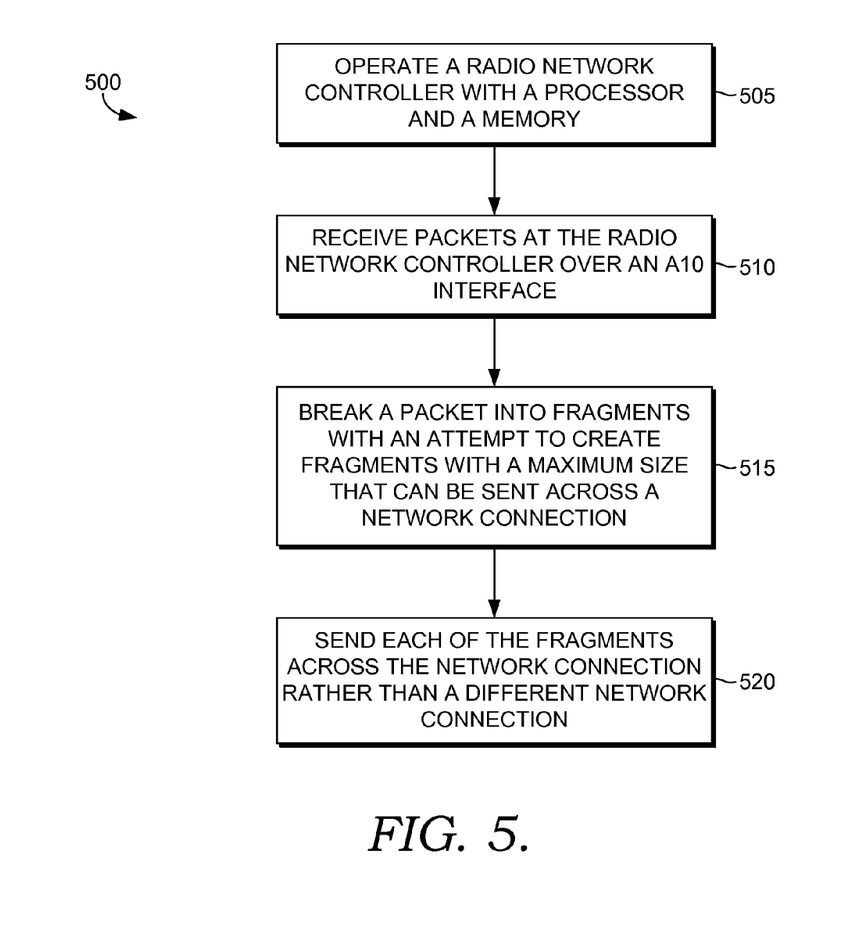
FIG. 5 is a flowchart of an exemplary process for optimizing packet fragmentation across multiple T-1 lines when practicing an embodiment of the present invention.

Turning now to FIG. 5, a process for optimizing packet fragmentation across multiple T-1 lines is shown in a method 500. In a step 505, RNC 109 operates a processor and a memory. In a step 510, packets 123B and 125B are received at RNC 109 over an A10 interface. Because of the A10 interface, packets 123B and 125B can have a maximum size of 1500 bytes. In an alternate embodiment implementing another interface, a different maximum size can be used.

In a step 515, the packets are broken into fragments with an attempt to create fragments with a maximum size that can be sent across a network connection. In other words, packet 123B is encapsulated into fragments 140B and 142B. Packet 125B is encapsulated into fragments 144B and 146B. Since the network connection is a T-1 line, the maximum size of the fragment is 1200 bytes. If the network connection is another medium, the maximum size can change to a different amount. For example, if the network connection is the E-1 line, the maximum size can change.

In a step 520, fragments 140B and 142B are sent across the same T-1 line identified in FIG. 3 as connection 153 while fragments 144B and 146B are sent across the same T-1 line identified in FIG. 3 as connection 155.

The implementation of the embodiments of the present invention solves the issues of path and timing. Fragments of a packet traverse over the same T-1 line rather than being dispersed across different T-1 lines. This implementation insures that the packets do not arrive out of sequence at the data-only module. In addition, additional time delay is not needed nor implemented since the fragments traverse the same route in order and reach the data-only module within the prescribed time frame to be re-appended together as the original packet.

The prior discussion is only for illustrative purposes to convey exemplary embodiments. The steps discussed in FIGS. 4 and 5 may be executed without regards to order. Some steps may be omitted and some steps may be executed at a different time than shown. For example, step 420 may be executed before step 425. The point here is to convey that the figures are merely exemplary for the embodiments of the present invention and that other embodiments may be implemented for the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more computer-readable storage media having computer useable instructions executed by one or more computing devices for performing a method for fragmenting a packet for delivery in an environment with multiple network connections, the method comprising:
   receiving a packet at a radio network controller (RNC);
   analyzing the packet to determine a packet size of the packet;
   if the packet size of the packet is 734 bytes or less, sending the packet for delivery across a network connection in the environment with the multiple network connections;
   if the packet size is larger than 734 bytes, a) breaking the packet into one or more fragments to achieve a fragment size that is a maximum size that can pass across the network connection wherein breaking the packet into the one or more fragments comprises the RNC encapsulating the packets into Abis packets, b) waiting a time period for a last fragment from the one or more fragments to achieve the maximum size, c) adding bytes of data to the last fragment from one or more other fragments from another packet received at the radio network controller to achieve the maximum size; and
   sending the one or more fragments across the same network connection.

2. The media of claim 1, further comprising:
   waiting a time period for a last fragment in the one or more fragments to achieve the maximum size;
   adding another fragment from one or more new fragments from a new packet to the last fragment to achieve the maximum size; and
   sending the last fragment and the another fragment at the maximum size across the network connection.

3. The media of claim 2, further comprising sending the one or more fragments through an IP router and across the network connection.

4. The media of claim 3, wherein receiving the packet at the RNC comprises receiving the packet across an A10 interface.

5. The media of claim 3, wherein the network connection is selected from a group including a T-1 line.

6. The media of claim 3, wherein the maximum size is determined by a protocol for the Abis interface or the Iub interface.

7. The media of claim 6, wherein the maximum size is less than or equal to 1200 bytes.

8. A radio network controller (RNC) for optimizing packet fragmentation across multiple T-1 lines, comprising:
   the radio network controller operates with a processor and a memory;
   the radio network controller receives a plurality of packets over an A10 interface;
   the radio network controller breaks a packet into one or more fragments wherein the radio network controller attempts to create the one or more fragments with a maximum size that can be sent across a network connection;
   the radio network controller sends each of the one or more fragments across the network connection rather than a different network connection; and
   the radio network controller waits a time period for a last fragment from the one or more fragments to achieve the maximum size, adds bytes of data to the last fragment from one or more other fragments from another packet received at the radio network controller to achieve the maximum size, and sends the last fragment and the bytes of data, at the maximum size, across the network connection.

9. The radio network controller of claim 8, further comprising the radio network controller operable to send the each of the one or more fragments through an IP router and across the network connection.

10. The radio network controller of claim 9, wherein the network connection is selected from a group including a T-1 line.

11. The radio network controller of claim 9, wherein the maximum size is determined by a protocol for an Abis interface or a Iub interface.

12. The radio network controller of claim 11, wherein the maximum size is less than or equal to 1200 bytes.

13. One or more computer-readable storage media having computer useable instructions executed by one or more computing devices for performing a method for optimizing packet fragmentation across multiple T-1 lines, comprising:
- operating a radio network controller with a processor and a memory;
- receiving at the radio network controller a plurality of packets over an A10 interface;
- breaking a packet into one or more fragments with an attempt to create the one or more fragments with a maximum size that can be sent across a network connection;
- sending each of the one or more fragments across the network connection rather than a different network connection;
- waiting a time period for a last fragment from the one or more fragments to achieve the maximum size;
- adding bytes of data to the last fragment from one or more other fragments from another packet received at the radio network controller to achieve the maximum size; and
- sending the last fragment with the bytes of data, at the maximum size, across the network connection.

14. The media of claim 13, further comprising sending the each of the one or more fragments through an IP router and across the network connection.

15. The media claim 14, wherein the network connection is selected from a group including a T-1 line.

16. The media of claim 14, wherein the maximum size is determined by a protocol for an Abis interface or a Iub interface.

17. The media of claim 16, wherein the maximum size is less than or equal to 1200 bytes.

* * * * *